US011838087B2

(12) United States Patent
Murakami et al.

(10) Patent No.: US 11,838,087 B2
(45) Date of Patent: Dec. 5, 2023

(54) ANTENNA PLACEMENT METHOD AND ANTENNA SELECTION METHOD

(71) Applicant: NIPPON TELEGRAPH AND TELEPHONE CORPORATION, Tokyo (JP)

(72) Inventors: Tomoki Murakami, Musashino (JP); Shinya Otsuki, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/439,737

(22) PCT Filed: Mar. 11, 2020

(86) PCT No.: PCT/JP2020/010638
§ 371 (c)(1),
(2) Date: Sep. 15, 2021

(87) PCT Pub. No.: WO2020/195854
PCT Pub. Date: Oct. 1, 2020

(65) Prior Publication Data
US 2022/0103222 A1 Mar. 31, 2022

(30) Foreign Application Priority Data
Mar. 22, 2019 (JP) .................. 2019-055001

(51) Int. Cl.
*H04B 7/06* (2006.01)
(52) U.S. Cl.
CPC ......... *H04B 7/0691* (2013.01); *H04B 7/0617* (2013.01); *H04B 7/0626* (2013.01)

(58) Field of Classification Search
CPC .................................... H04B 7/0691
(Continued)

(56) References Cited

U.S. PATENT DOCUMENTS

2009/0135778 A1* 5/2009 Lee .................. H04W 72/1231
370/329
2009/0309802 A1* 12/2009 Lindgren ............... H01Q 21/10
343/816
(Continued)

OTHER PUBLICATIONS

Navarro Eduardo, 2011, "Wi-Fi Localization Using RSSI Fingerprinting", California Polytechnic State University, United States of America. http://digitalcommons.calpoly.edu/cpesp/17/ (Aug. 17, 2011).
(Continued)

*Primary Examiner* — Lihong Yu
(74) *Attorney, Agent, or Firm* — Harness, Dickey & Pierce, P.L.C.

(57) ABSTRACT

Provided is an antenna placement method in a system for detecting an object in a detection area between at least one set of a transmission station and a reception station by a wireless signal. The antenna arrangement method includes: making the transmission station having a plurality of antennas transmit a measurement signal for measuring channel state information; making the reception station having a plurality of antennas measure the channel state information based on the measurement signal and notify a detection server of a result of the measurement; and making the detection server perform processing where the detection server detects an object based on the channel state information, calculates at least one of a channel capacity and an eigenvalue distribution based on a propagation channel matrix between the transmission station and the reception station, and determines an antenna arrangement where the
(Continued)

channel capacity becomes a largest or an antenna arrangement where spreading of the eigenvalue distribution becomes a smallest.

8 Claims, 11 Drawing Sheets

(58) Field of Classification Search
USPC .......................................................... 375/267
See application file for complete search history.

(56) References Cited

U.S. PATENT DOCUMENTS

| 2010/0054353 A1* | 3/2010 | Roh | H04L 1/0656 |
| | | | 375/260 |
| 2015/0071112 A1* | 3/2015 | Nammi | H04B 7/024 |
| | | | 370/254 |
| 2019/0170869 A1* | 6/2019 | Kravets | G01S 13/886 |
| 2022/0077904 A1* | 3/2022 | Chang | H04B 7/0608 |

OTHER PUBLICATIONS

Wang, Wei, et al. "Understanding and modeling of wifi signal based human activity recognition." Proceedings of the 21st annual international conference on mobile computing and networking. ACM, 2015.

Yang, Zheng, Zimu Zhou, and Yunhao Liu. "From RSSI to CSI: Indoor localization via channel response." ACM Computing Surveys (CSUR) 46.2 (2013): 25.

International Search Report issued in PCT/JP2020/010638, dated Jun. 2, 2020.

* cited by examiner

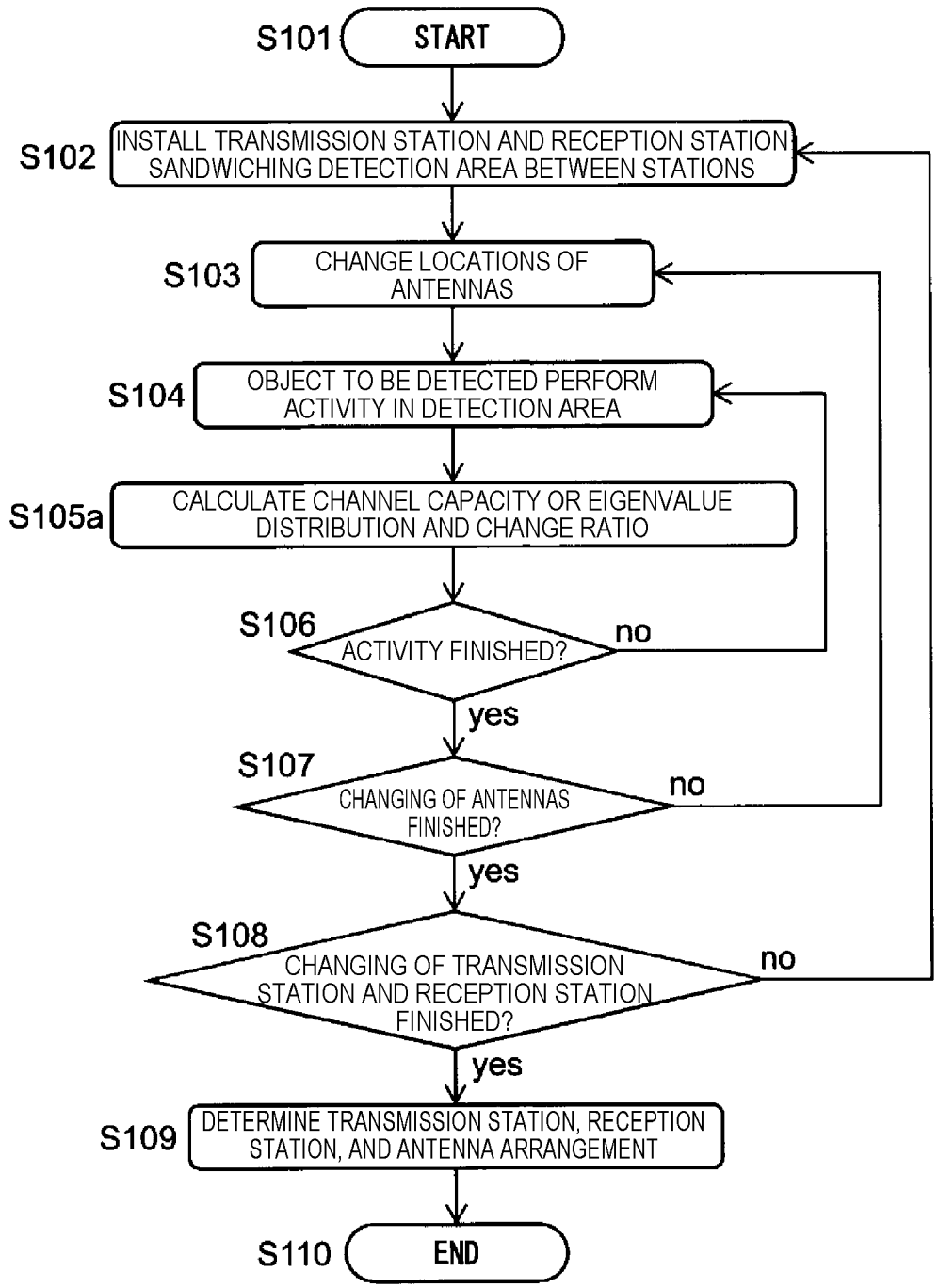

US 11,838,087 B2

ANTENNA PLACEMENT METHOD AND ANTENNA SELECTION METHOD

CROSS-REFERENCE TO RELATED APPLICATIONS

This application is a 371 U.S. National Phase of International Application No. PCT/JP2020/010638 filed on Mar. 11, 2020 which claims priority to Japanese Application No. 2019-055001 filed on Mar. 22, 2019. The entire disclosures of the above applications are incorporated herein by reference.

TECHNICAL FIELD

The present invention relates to an antenna placement method and an antenna selection method in a system which detects an object based on channel state information of a wireless signal.

BACKGROUND ART

Recently, various services are available where an RSSI (received signal strength indicator) which is signal strength information in a wireless signal is used. For example, there has been adopted a technique where in a service which provides positions of wireless terminal stations using a wireless LAN (local area network) system, a wireless terminal station measures RSSI of beacon signals transmitted from a plurality of wireless base stations, and the position of the wireless terminal station is calculated based on a plurality of measured RSSI (for example, Non-Patent Literature 1). Further, as another service which uses RSSI, a technique which detects a human activity (breathing or action) or an object based on a change characteristic of RSSI has been studied (for example, Non-Patent Literature 2). Aiming at further enhancement of detection accuracy, a technique has been studied where the detection of an object is performed using a channel state information (CSI) in respective subcarriers of OFDM (orthogonal frequency division multiplexing) modulation in addition to RSSI which is an average value of frequency bands of signals used in respective systems. Channel state information in the wireless LAN system is information on amplitudes for respective subcarriers of OFDM modulation, a phase difference between antennas and the like in a propagation path between an antenna of a wireless base station and an antenna of a wireless terminal station. For example, in Non-Patent Literature 3, a technique which enables, by using channel state information, estimation of position, the detection of activity and the like of an object such as a human with high accuracy has been studied.

CITATION LIST

Non-Patent Literature

Non-Patent Literature 1: Navarro Eduardo, 2011. "Wi-Fi Localization Using RSSI Fingerprinting", California Polytechnic State University, United States of America. http://digitalcommons.calpoly.edu/cpesp/17/ (17 Aug. 2011)

Non-Patent Literature 2: Wang, Wei, et al. "Understanding and modeling of wifi signal based human activity recognition." Proceedings of the 21st annual international conference on mobile computing and networking. ACM, 2015.

Non-Patent Literature 3: Yang, Zheng, Zimu Zhou, and Yunhao Liu. "From RSSI to CSI: Indoor localization via channel response." ACM Computing Surveys (CSUR) 46.2 (2013): 25.

SUMMARY OF THE INVENTION

Technical Problem

As has been described in Background Art, in providing services such as the detection of an object or the detection of activity, it is extremely important to increase detection accuracy. The detection accuracy when wireless signals are used depends on a detection algorithm, sensitivities of transceivers, amount of information used in detection, the number of transceivers used in detection, the antenna arrangement of transceivers and the like. However, for example, when the number of transceivers is increased, besides the increase of a cost, there arise problems in an arrangement method, a selection method and the like of antennas for enhancing detection accuracy, and a technique for optimizing such methods has not been sufficiently studied.

It is an object of the present invention to provide an antenna arrangement method and an antenna selection method where, in the wireless detection system which detects an object or detects activity based on channel state information, detection accuracy can be enhanced by adopting antenna arrangement where a wireless signal reaches in a wide range in a detection area and a channel capacity becomes the largest, and an amount of undesired information can be reduced by selecting the antennas which largely contribute to detection accuracy.

Means for Solving the Problem

According to a first invention, there is provided an antenna arrangement method in a system for detecting an object in a detection area between at least one set of a transmission station and a reception station by a wireless signal. The antenna arrangement method includes: making the transmission station having a plurality of antennas transmit a measurement signal for measuring channel state information; making the reception station having a plurality of antennas measure the channel state information based on the measurement signal and notify a detection server of a result of the measurement; and making the detection server perform processing where the detection server detects an object based on the channel state information, calculates at least one of a channel capacity and an eigenvalue distribution based on a propagation channel matrix between the transmission station and the reception station, and determines an antenna arrangement where the channel capacity becomes a largest or an antenna arrangement where spreading of the eigenvalue distribution becomes a smallest.

In the antenna arrangement method of the first invention, a second invention is directed to a technical feature where the antenna arrangement method further includes providing a function of performing weighting to a signal of the antennas of at least one of the transmission station and the reception station; and making the detection server perform processing where the detection server calculates at least one of the channel capacity and the eigenvalue distribution based on the propagation channel matrix between the transmission station and the reception station for each of a plurality of combinations of an antenna arrangement and a weighting coefficient, and determines a combination of the antenna arrangement and the weighting coefficient where the channel capacity becomes the largest or the combination of the antenna arrangement and the weighting coefficient where spreading of the eigenvalue distribution becomes the smallest.

In the antenna arrangement method of the first or the second invention, a third invention is directed to a technical feature where the antenna arrangement method includes providing a function of switching the antennas of at least one of the transmission station and the reception station; and making the detection server perform processing where the detection server calculates at least one of the channel capacity and the eigenvalue distribution based on the propagation channel matrix between the transmission station and the reception station for each of a plurality of combinations of an antenna arrangement and an antenna switching pattern, and determines a combination of the antenna arrangement and the antenna switching pattern where the channel capacity becomes the largest or the combination of the antenna arrangement and the antenna switching pattern where spreading of the eigenvalue distribution becomes the smallest.

In the antenna arrangement method of any one of the first to the third invention, a fourth invention is directed to a technical feature where the channel capacity is calculated by a following equation $$C=\log_2 \det(I+H^H H),$$

wherein I is an identity matrix, H is a propagation channel matrix normalized so that an entire norm is 1, and $^H$ is a Hermitian matrix.

According to a fifth invention, there is provided an antenna selection method in a system for detecting an object in a detection area between at least one set of a transmission station and a reception station by a wireless signal. The antenna selection method includes: making the transmission station having a plurality of antennas transmit a measurement signal for measuring channel state information; making the reception station having a plurality of antennas perform measurement of the channel state information based on the measurement signal and notify a detection server of a result of the measurement; and making the detection server detect an object based on the channel state information, calculate at least one of a channel capacity and an eigenvalue distribution based on a propagation channel matrix between the transmission station and the reception station, and not select the antenna where the channel capacity becomes equal to or below a threshold value set in advance or not select the antenna where a difference equal to or more than a threshold value set in advance exists in the eigenvalue distribution.

In the antenna selection method of the fifth invention, a sixth invention is directed to a technical feature where the channel capacity is calculated by a following equation $$C=\log_2 \det(I+H^H H),$$

wherein I is an identity matrix, H is a propagation channel matrix normalized so that an entire norm is 1, and $^H$ is a Hermitian matrix.

Effects of the Invention

According to the antenna arrangement method and the antenna selection method of the present invention, in the wireless detection system which detects an object or detects activity based on channel state information, detection accuracy can be enhanced by adopting antenna arrangement where a wireless signal reaches in a wide range in a detection area and a channel capacity becomes the largest, and an amount of undesired information can be reduced by selecting the antennas which largely contribute to detection accuracy.

BRIEF DESCRIPTION OF DRAWINGS

FIG. 11 is a drawing showing an example of processing for determining antenna arrangement by adding a change ratio of a propagation channel.

DESCRIPTION OF EMBODIMENTS

Hereinafter, an antenna arrangement method and an antenna selection method according to embodiments of the present invention are described with reference to drawings.

Figure 1:
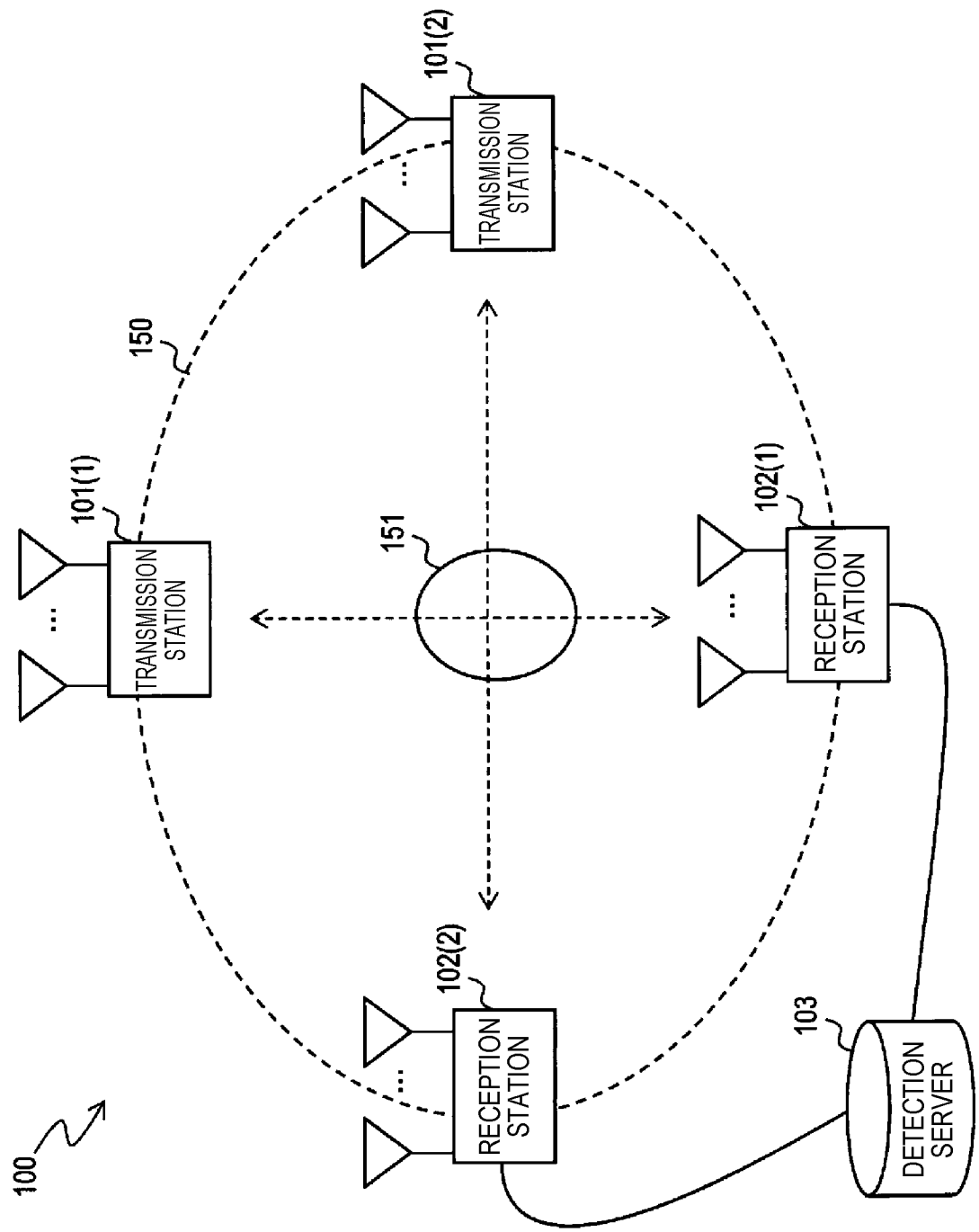
FIG. 1 is a drawing showing an example of a wireless detection system.

FIG. 1 shows an example of a wireless detection system 100. The wireless detection system 100 is a system which performs the detection of an object, the detection of activity or the like using wireless signals, and used in common by respective embodiments described hereinafter. In FIG. 1, the wireless detection system 100 includes a transmission station 101(1), a transmission station 101(2), a reception station 102(1), a reception station 102(2) and a detection server 103. In such a wireless detection system 100, when the description common to both of the transmission station 101(1) and the transmission station 101(2) is made, the number in parenthesis at the end of the symbol is omitted. For example, the transmission station 101(1) and the transmission station 101(2) are expressed as the transmission station 101. When a specific block is indicated, the number in parenthesis is added to the end of the symbol, and is expressed as the transmission station 101(1), for example. The reception station 102(1) and the reception station 102(2) are also expressed in the same manner. In the description made hereinafter, a plurality of blocks having the same function are also expressed in the same manner.

In FIG. 1, the wireless detection system 100 detects an object 151 existing on a propagation path between two transmission stations 101 and two reception stations 102 by the detection server 103 which is connected to the reception station 102(1) and the reception station 102(2). For example, a wireless signal transmitted from the transmission station 101(1) to the reception station 102(1) is influenced by the object 151 existing on an intermediate portion of the propagation path. In the same manner, a wireless signal transmitted from the transmission station 101(2) to the reception station 102(2) is influenced by the object 151 existing on the intermediate portion of the propagation path. Accordingly, the detection server 103 detects the position or the action of the object 151 in a detection area 150 by measuring RSSI and phases in the reception station 102(1) and the reception station 102(2). The wireless detection system 100 uses at least one set of transmission station 101 and the reception station 102.

First Embodiment

Figure 2:
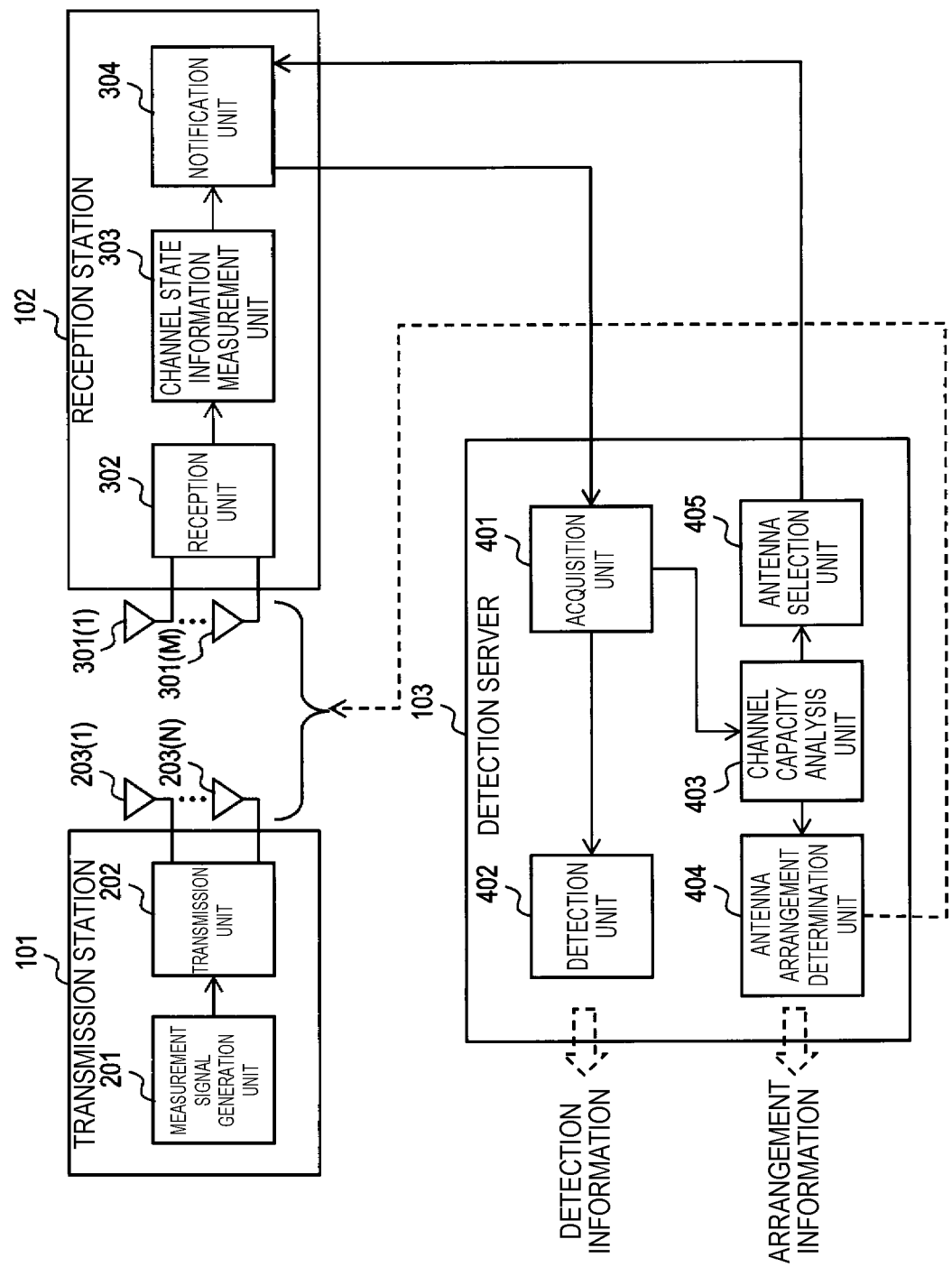
FIG. 2 is a drawing showing a configurational example of a transmission station, a reception station and a detection server according to a first embodiment.

FIG. 2 shows a configurational example of a transmission station, a reception station and a detection server according to a first embodiment. In FIG. 2, only main functional blocks relating to the embodiment are shown, and functional blocks which a general wireless base station has are omitted.

In FIG. 2, a transmission station 101 includes a measurement signal generation unit 201, a transmission unit 202 and a plurality of antennas 203. The transmission station 101 corresponds to a wireless base station in a wireless LAN system, for example.

The measurement signal generation unit 201 generates a measurement signal for enabling the reception station 102 to measure channel state information, and outputs the measurement signal to the transmission unit 202. As an example of the measurement signal, a signal known to the transmission station 101 and the reception station 102 (a training signal for measuring a propagation path response) is named.

The transmission unit 202 converts a measurement signal generated by the measurement signal generation unit 201 into a wireless LAN signal, for example, addressed to a subordinate reception station 102, and outputs the wireless LAN signal to the plurality of antennas 203.

The antennas 203 include N pieces (N being a positive integer) of antenna from the antenna 203(1) to the antenna 203(N). The antennas 203 convert the wireless LAN signal which the transmission unit 202 outputs into electromagnetic waves, and radiates the electromagnetic waves in air. The antennas 203 may have directivity or may not have directivity. The individual antennas 203 are connected to the transmission unit 202 by cables, and can be arranged at arbitrary positions. The antennas 203 may form distributed array antennas. In this case, a mechanism which moves the positions of the individual antennas 203 may be provided such that the positions of the individual antennas 203 can be automatically changed, or an operator may move the individual antennas 203. Plural kinds of antennas 203 may be installed in advance, and a kind of the antenna 203 (for example, a parabolic antenna, a planar antenna, a dipole antenna or the like) can be automatically switched by a switch. Alternatively, an operator may remove a cable, and may connect a different kind of antenna 203. In automatically arranging or switching the antenna 203, a moving mechanism, a switching switch and the like are controlled by an antenna arrangement determination unit 404 and an antenna selection unit 405 of a detection server 103 described later.

In FIG. 2, the reception station 102 includes a plurality of antennas 301, a reception unit 302, a channel state information measurement unit 303 and a notification unit 304. The reception station 102 corresponds to a wireless terminal station in the wireless LAN system, for example.

The antennas 301 include M pieces (M being a positive integer) of antenna from the antenna 301(1) to the antenna 301(M). The antennas 301 receive electromagnetic waves transmitted from the transmission station 101, and coverts the electromagnetic waves into wireless LAN signals. The antennas 301 may have directivity or may not have directivity.

The reception unit 302 converts wireless signals received by the plurality of antennas 301 into measurement signals which can be handled by the channel state information measurement unit 303, and outputs the measurement signals to the channel state information measurement unit 303.

The channel state information measurement unit 303 measures channel state information (for example, RSSI, phases and the like between respective antennas) based on the measurement signals inputted from the reception unit 302, and outputs a result of the measurement to the notification unit 304.

The notification unit 304 converts the channel state information inputted from the channel state information measurement unit 303 into a format which allows the transmission of the channel state information to the detection server 103, and notifies the channel state information to the detection server 103. The notification unit 304, in response to antenna information (for example, designation of the antenna) inputted from the detection server 103, can notify the detection server 103 of information (channel state information such as RSSI, phases) of the designated antenna.

In FIG. 2, the detection server 103 includes an acquisition unit 401, a detection unit 402, a channel capacity analysis unit 403, the antenna arrangement determination unit 404 and the antenna selection unit 405.

The acquisition unit 401 acquires channel state information notified from the reception station 102, and outputs the information to the detection unit 402 and the channel capacity analysis unit 403.

The detection unit 402 performs determination of the detection of an object and the detection of an activity based on the channel state information. Information on the result of detection (detection information) may be held in the detection unit 402 or may be outputted to the outside from the detection unit 402. As a determination technique, a well-known technique such as clustering based on machine learning can be used. The detail of the determination technique is omitted.

The channel capacity analysis unit 403 calculates a channel capacity C between the plurality of antennas using an equation (1).

$$C = \log_2 \det(I + H^H H) \qquad (1)$$

In the equation (1), I is an identity matrix, H is a propagation channel matrix normalized so that an entire norm is 1, and $^H$ is a Hermitian matrix. The channel capacity analysis unit 403 calculates a plurality of eigenvalues from a propagation channel matrix H between the transmission station 101 and the reception station 102, and acquires the distribution of the plurality of eigenvalues. Then, the channel capacity analysis unit 403 outputs the calculated result to the antenna arrangement determination unit 404 and the antenna selection unit 405. The channel capacity and the eigenvalue distribution are calculated each time antenna arrangement including locations where the transmission station 101 and the reception station 102 are installed is changed.

The antenna arrangement determination unit 404 determines the antenna arrangement including the arrangement of the transmission and reception stations suitable for the detection of an object based on channel capacities of the respective transmission and reception stations or the eigenvalue distribution which the channel capacity analysis unit 403 outputs. When the antenna arrangement determination unit 404 uses channel capacities, the antenna arrangement determination unit 404 determines the antenna arrangement to an antenna arrangement where the channel capacity of the entire system becomes the largest. When the antenna arrangement determination unit 404 uses the eigenvalue distribution, the antenna arrangement determination unit 404 determines the antenna arrangement to an antenna arrangement where magnitudes of the eigenvalues are close to each other (spreading of the eigenvalue distribution being the smallest). In this manner, the antenna arrangement determination unit 404 determines the antenna arrangement. The information on the determined antenna arrangement may be outputted to the outside as arrangement information such that an operator can get access to the information. When the antenna arrangement or switching of the antenna 203 of the transmission station 101 and the antenna 301 of the reception station 102 are automatically performed, the antenna arrangement determination unit 404 may control an antenna moving mechanism or an antenna switching switch provided to the antenna 203 of the transmission station 101 and the antenna 301 of the reception station 102.

The antenna selection unit 405 selects the antenna to be used based on at least one of the channel capacity or the eigenvalue distribution which the channel capacity analysis unit 403 outputs. When the antenna selection unit 405 uses the channel capacity, the antenna selection unit 405 performs processing such that the antenna where the channel capacity is equal to or below a threshold value is not selected. When the antenna selection unit 405 uses the eigenvalue distribution, the antenna selection unit 405 performs processing such that the antenna where a difference equal to or more than a threshold value exists between the magnitudes of the eigenvalues is not selected. In this manner, the antenna selection unit 405 can select the antenna to be used.

Figure 3:
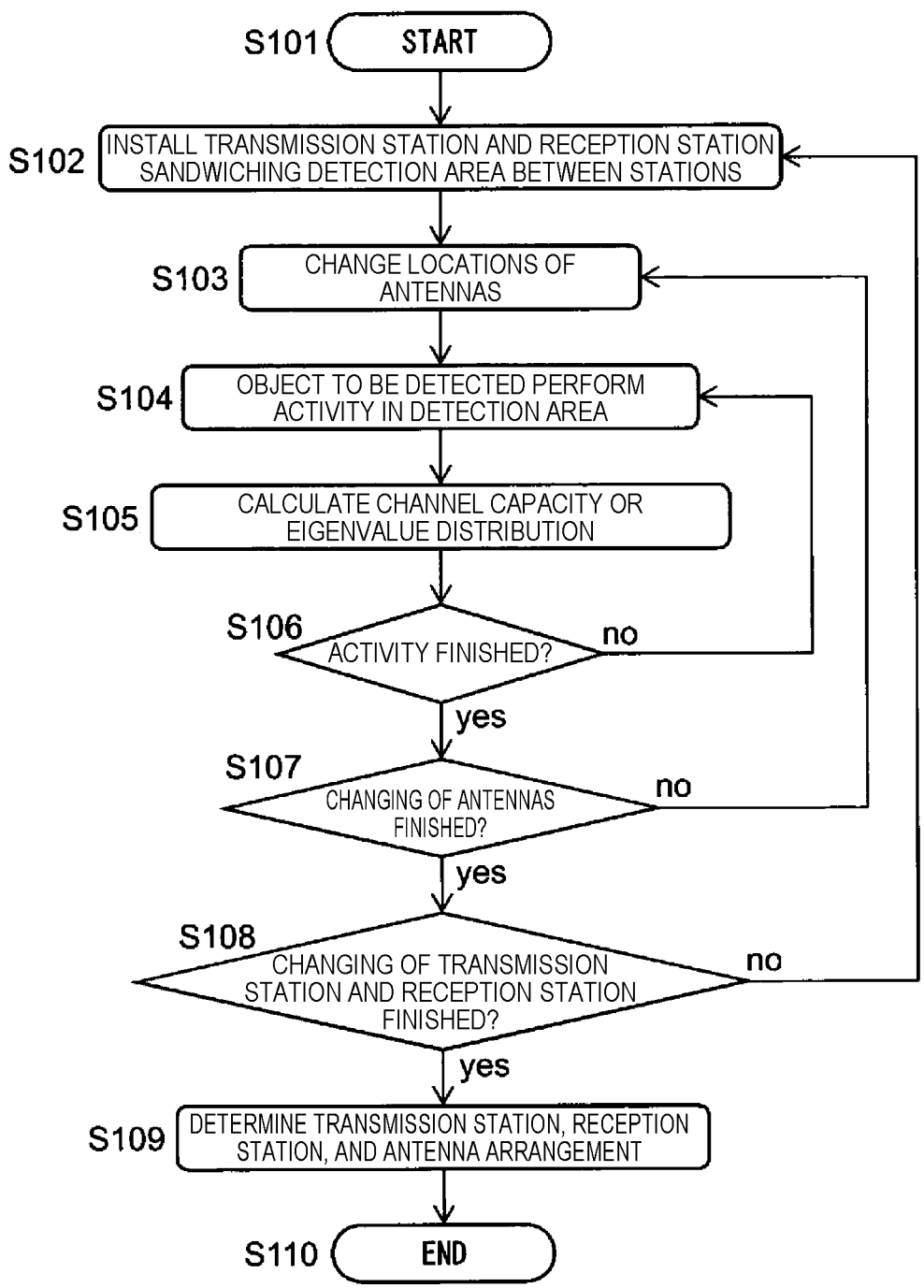
FIG. 3 is a drawing showing an example of processing in an antenna arrangement method according to the first embodiment.

FIG. 3 shows an example of processing in an antenna arrangement method according to the first embodiment. The processing shown in FIG. 3 is performed by the transmission station 101, the reception station 102 and the detection server 103 described in FIG. 2.

In step S101, processing of the antenna arrangement method according to the first embodiment is started.

In step S102, the transmission station 101 and the reception station 102 are installed such that a detection area 150 is sandwiched between the transmission station 101 and the reception station 102. The installation of the transmission station 101 and the reception station 102 may be performed by an operator. Alternatively, installation locations of the transmission station 101 and the reception station 102 may be automatically switched from the detection server 103 by providing a mechanism which switches stations to be used among a plurality of transmission stations 101 and a plurality of reception stations 102 installed in advance.

In step S103, the location of the antenna of at least one of the transmission station 101 and the reception station 102 is changed. The location of the antenna may be changed including the orientation of the antenna, a kind of antenna and the number of antennas and the like. The antenna may be changed manually by an operator, or the detection server 103 may automatically change the antenna in accordance with a program. In this case, for example, by providing a mechanism which changes the location and orientation of the antenna to the transmission station 101 and the reception station 102, the location and orientation of the antenna can be controlled in accordance with a command from the detection server 103. As kinds of the antennas, for example, a parabolic antenna, a planar antenna, a dipole antenna and the like are installed in advance. The kind of the antenna can be controlled in accordance with a command from the detection server 103 by switching using a switch. The number of antennas can be also controlled in accordance with a command from the detection server 103 by selecting an arbitrary antenna by the switch.

In step S104, an object to be detected (an object such as a human) performs activity in the detection area 150. Then, the measurement of channel state information between the respective antennas of the transmission station 101 and the reception station 102 is started, and the measured channel state information is stored.

In step S105, a channel capacity or an eigenvalue distribution is calculated based on the channel state information between the respective antennas stored in step S104.

In step S106, whether or not the activity of the object to be detected is finished is determined. The determination whether or not the activity of the object to be detected is finished is performed based on whether or not variations of the activity of the object to be detected (a range of activity including the determination of a human or an object and kinds of actions) set in advance are all completed, and when all variations are completed, processing advances to step S107, and when the variations are not completed, processing advances to step S104.

In step S107, whether or not changing of antennas is finished is determined. The determination whether or not the changing of antennas is finished is performed based on whether or not variations of the changing of antennas (locations, orientations, kinds of antennas, and kinds of combinations of the numbers of antennas) are all completed, and when all variations are completed, processing advances to step S108, and when the variations are not completed, processing advances to step S103. Assume that the variations of the changing of antennas are set in advance.

In step S108, whether or not changing of the transmission station 101 and the reception station 102 is finished is determined. The determination whether or not the changing of the transmission station 101 and the reception station 102 is finished is performed based on whether or not variations of locations where the transmission station 101 and the reception station 102 are installed (kinds of installation locations) are all completed, and when all variations are completed, processing advances to step S108, and when the variations are not completed, processing advances to step S102. Assume that the variations of the locations where the transmission station 101 and the reception station 102 are installed are set in advance.

In step S109, the transmission station 101, the reception station 102 and the antenna arrangement are determined. The determination of the antenna arrangement including the locations where the transmission station 101 and the reception station 102 are installed is performed based on channel capacities or eigenvalue distributions at respective antenna arrangements. For example, at least one of the antenna arrangement where the calculated channel capacity becomes the largest or the antenna arrangement where spreading of the eigenvalue distribution becomes the smallest is extracted, and the antenna arrangement is determined to the extracted antenna arrangement. In the embodiment, the optimum antenna arrangement is determined by changing the locations where the transmission station 101 and the reception station 102 are installed and hence, the antenna arrangement is determined including the arrangement of the stations, that is, the arrangement of the transmission station 101 and the reception station 102.

In step S110, processing of antenna arrangement method according to the first embodiment is finished.

In this manner, in the antenna arrangement method according to the embodiment, channel state information is measured by transmitting and receiving a measurement signal between the transmission station 101 and the reception station 102 for every combination given in the form of a variation of an activity of an object to be detected which is set in advance, a variation of changing of antennas which is set in advance and a variation of locations where the transmission station 101 and the reception station 102 are installed which is set in advance or the like, and a channel capacity or an eigenvalue distribution is calculated for every one of the plurality of measured combinations, and the antenna arrangement optimum for the detection of an object can be determined based on the calculated channel capacity or the eigenvalue distribution.

Figure 4:
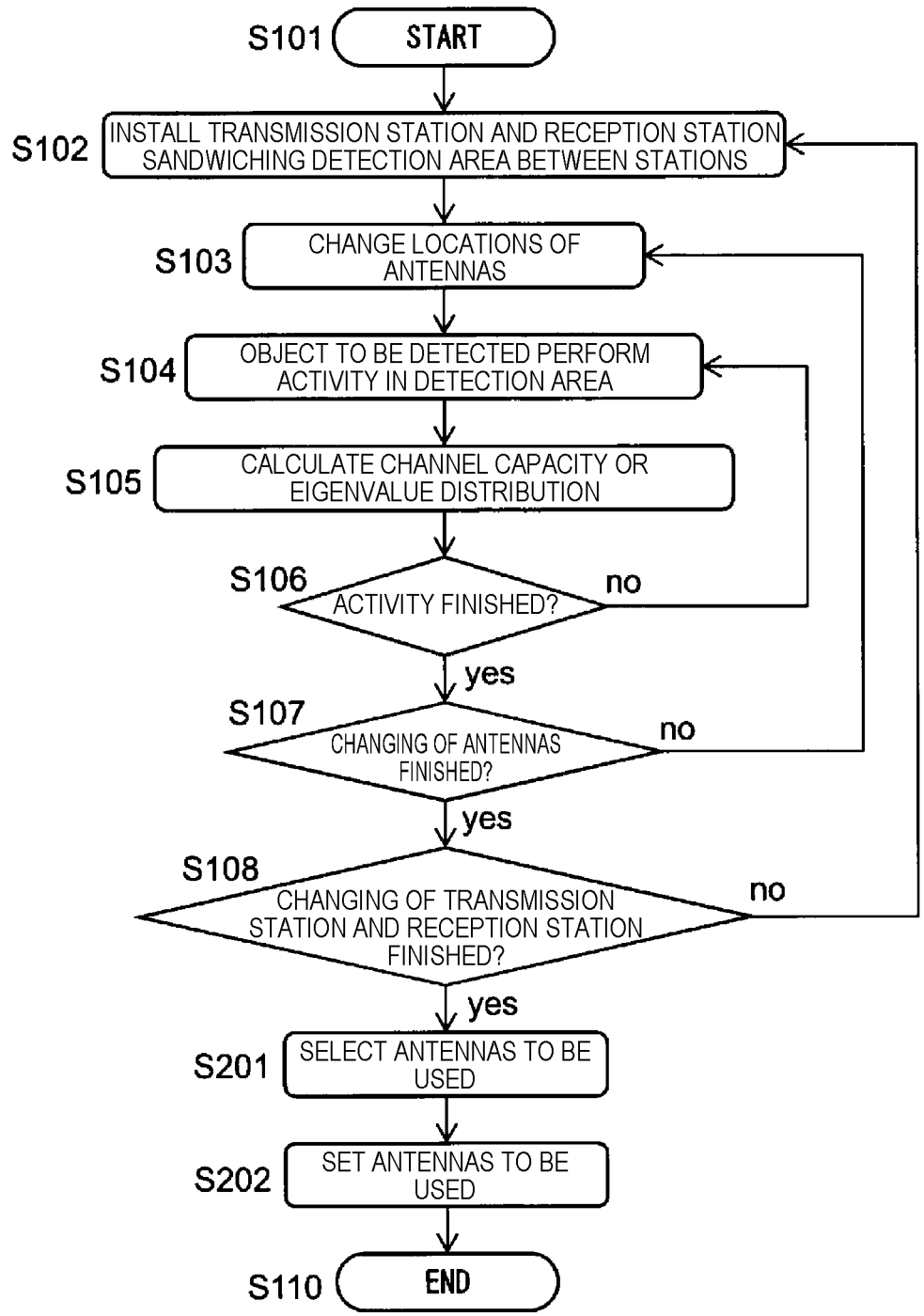
FIG. 4 is a drawing showing an example of processing in an antenna selection method according to the first embodiment.

FIG. 4 shows an example of processing in an antenna selection method according to the first embodiment. Processing shown in FIG. 4 is performed by respective blocks which constitute the transmission station 101, the reception station 102 and the detection server 103 described in FIG. 2. In FIG. 4, processing from step S102 to step S108 are equal to the processing in the antenna arrangement method described in FIG. 3 and hence, processing which differs from the processing shown in FIG. 3 is described.

In step S201, the antennas to be used are selected. In the selection of the antennas to be used, the antennas to be used are selected based on at least one of a channel capacity or an eigenvalue distribution between the transmission station 101 and the reception station 102. For example, when the channel capacity is used, the antenna selection unit 405 performs the selection such that the antennas where the channel capacity is equal to or below a threshold value are not selected. When the eigenvalue distribution is used, the antenna selection unit 405 performs the selection such that the antennas where a difference equal to or more than a threshold value exists between the magnitudes of eigenvalues are not selected.

In step S202, setting of the antennas to be used is performed. Note that the setting of the antennas to be used is performed by the antenna selection unit 405 notifying the transmission station 101 and the reception station 102, equipped with the antennas which are determined not to be selected in step S201. Then, the transmission station 101 and the reception station 102 which receive such notification do not notify the detection server 103 of information relating to the antennas determined not to be selected. Accordingly, it is unnecessary to process undesired information and hence, efficiency can be enhanced.

In this manner, in the antenna selection method according to the embodiment, channel state information is measured by transmitting and receiving a measurement signal between the transmission station 101 and the reception station 102 for every combination given in the form of a variation of an activity of an object to be detected which is set in advance, a variation of changing of antennas which is set in advance and a variation of locations where the transmission station 101 and the reception station 102 are installed which is set in advance or the like, and a channel capacity or an eigenvalue distribution is calculated for every one of the plurality of measured combinations, and the antennas which are not used in the detection of an object can be selected based on the calculated channel capacity or the eigenvalue distribution. In this manner, in the embodiment, an amount of undesired information can be reduced by not selecting the antennas which do not largely contribute to detection accuracy.

In the antenna arrangement method and the antenna selection method described above, the locations where the transmission station 101 and the reception station 102 are installed, the locations, orientations, kinds, the number and the like of the antennas are changed. However, it may be also possible that each channel state information is measured by changing a material of an object to be detected in the detection area 150 or by changing a position and a material of a non-movable object (a desk, a partition, a reflector or the like), and the optimum antenna arrangement or the optimum antenna selection is performed. In this case, it is possible to enhance detection accuracy of the wireless detection system 100 when various kinds of objects actually exist in the detection area 150.

Second Embodiment

Figure 5:
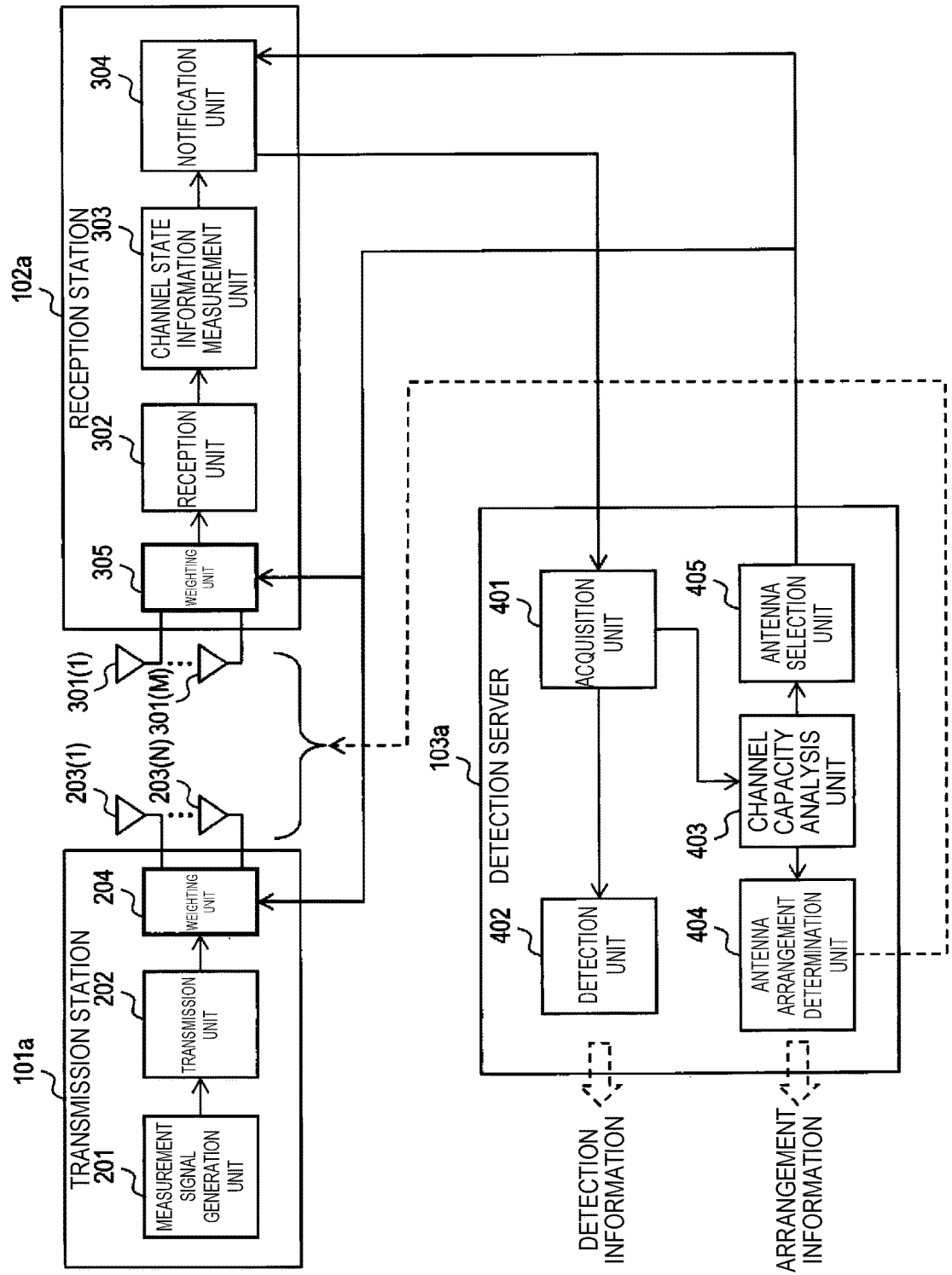
FIG. 5 is a drawing showing a configurational example of a transmission station, a reception station and a detection server according to a second embodiment.

FIG. 5 shows a configurational example of a transmission station 101$a$, a reception station 102$a$ and a detection server 103$a$ according to a second embodiment. In FIG. 5, in the same manner as FIG. 2, only main functional blocks relating to the embodiment are shown, and functional blocks which a general wireless base station has are omitted. In FIG. 5, blocks having the same symbols as the corresponding blocks shown in FIG. 2 have substantially the same functions as the blocks shown in FIG. 2.

In FIG. 5, the transmission station 101$a$ includes a measurement signal generation unit 201, a transmission unit 202, a plurality of antennas 203 and a weighting unit 204. The reception station 102$a$ includes a plurality of antennas 301, a reception unit 302, a channel state information measurement unit 303, a notification unit 304 and a weighting unit 305. In the embodiment, the transmission station 101$a$ corresponds to a wireless base station in a wireless LAN system, for example, and the reception station 102$a$ corresponds to a wireless terminal station in the wireless LAN system, for example.

In the transmission station 101$a$, the measurement signal generation unit 201, the transmission unit 202 and the antennas 203 are operated substantially in the same manner as the transmission station 101 shown in FIG. 2. In the reception station 102$a$, the antenna 301, the reception unit 302, the channel state information measurement unit 303 and the notification unit 304 are operated substantially in the same manner as the reception station 102 shown in FIG. 2.

In FIG. 5, the weighting unit 204 of the transmission station 101$a$, in transmitting measurement signals from the plurality of antennas 203, performs weighting of measurement signals transmitted from respective antennas. The weighting unit 204 of the transmission station 101$a$ performs weighting by multiplying an amplitude and a phase of the antenna 203(1) by a coefficient a(1) and a coefficient b(1) respectively thus changing the amplitude and the phase, for example. In the same manner, the weighting unit 204 of the transmission station 101$a$ performs weighting by multiplying an amplitude and a phase of the antenna 203(N) by a coefficient a(N) and a coefficient b(N) respectively. It is assumed that weighting coefficients in plurality of combinations are determined in advance, and the weighting unit 204 of the transmission station 101$a$ performs weighting by setting the weighting coefficients in combination designated from the detection server 103$a$.

In the same manner, the weighting unit 305 of the reception station 102 performs weighting of a signal which each antenna of the plurality of antennas 301 receives. The weighting unit 305 of the reception station 102 performs weighting by multiplying an amplitude and a phase of the antenna 301(1) by a coefficient c(1) and a coefficient d(1) respectively, for example, thus changing the amplitude and the phase. In the same manner, the weighting unit 305 of the reception station 102 performs weighting by multiplying an amplitude and a phase of the antenna 301(M) by a coefficient c(M) and a coefficient d(M) respectively. In the same manner as the weighting coefficients of the transmission station 101a, it is assumed that weighting coefficients in plurality of combinations are determined in advance, and the weighting unit 305 of the reception station 102 performs weighting by setting the weighting coefficients in combination designated from the detection server 103a.

In this manner, in the antenna arrangement method according to the embodiment, in the same manner as the system shown in FIG. 2 described in the first embodiment, channel state information is measured by transmitting and receiving measurement signals between the transmission station 101a and the reception station 102a, and an optimum antenna arrangement and weighting coefficients can be determined based on a channel capacity or an eigenvalue distribution calculated for each combination of the antenna arrangement and a weighting coefficient.

In the antenna arrangement method according to the first embodiment, the optimum antenna arrangement is determined out of the plurality of antenna arrangements which include locations where the transmission station 101 and the reception station 102 are installed. In the antenna arrangement method according to the second embodiment, the antenna arrangement is determined out of the combinations of the antenna arrangements and the weighting coefficients and hence, the detection accuracy of the wireless detection system 100 can be enhanced. Also, in the antenna selection method according to the second embodiment, a channel capacity or an eigenvalue distribution is calculated for each combination of the antenna arrangement and the weighting coefficient, and an antenna which is not used in the detection of an object can be selected in the same manner as the first embodiment.

Figure 6:
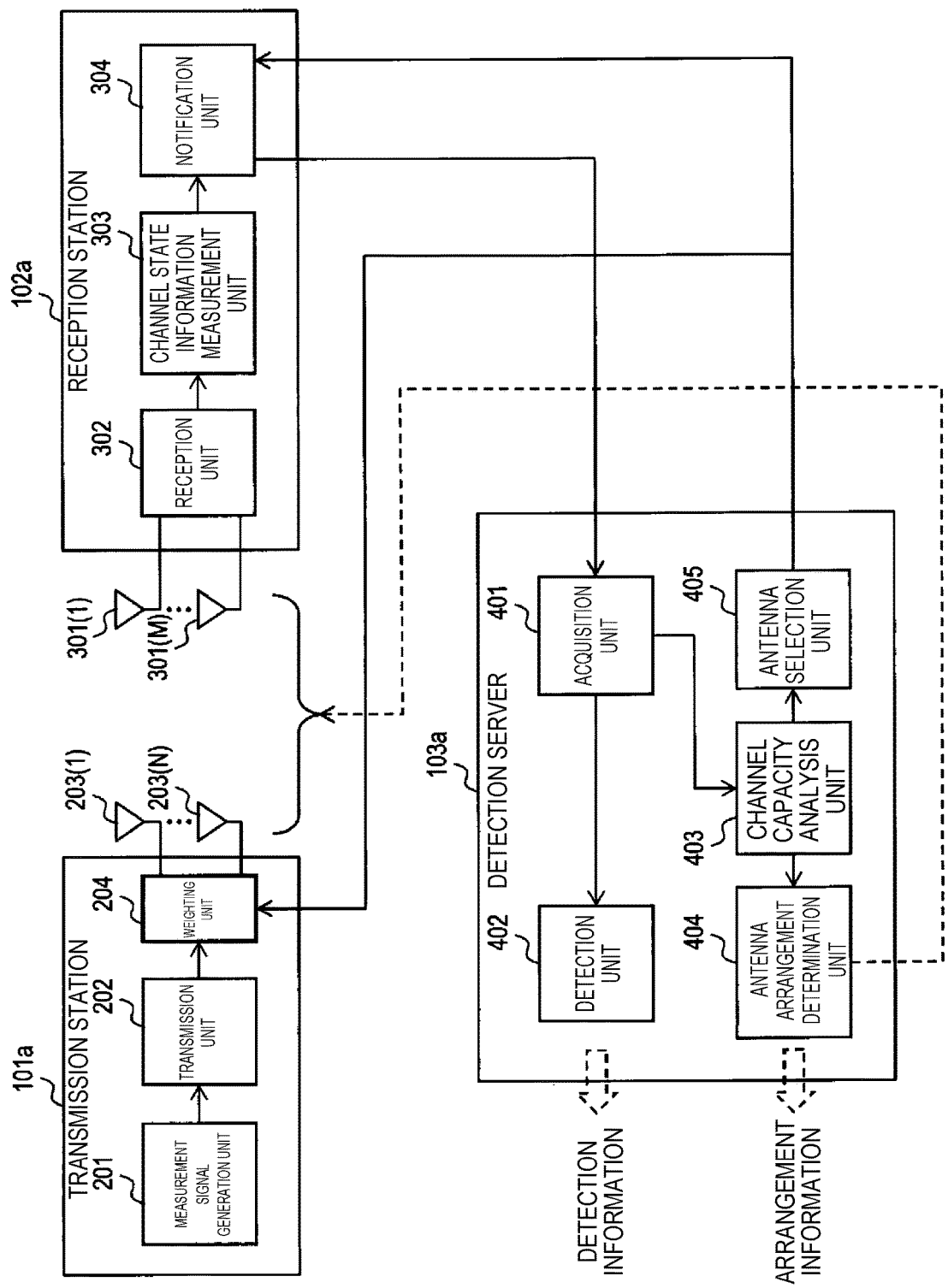
FIG. 6 is a drawing showing an example where a transmission station includes a weighting unit.
Figure 7:
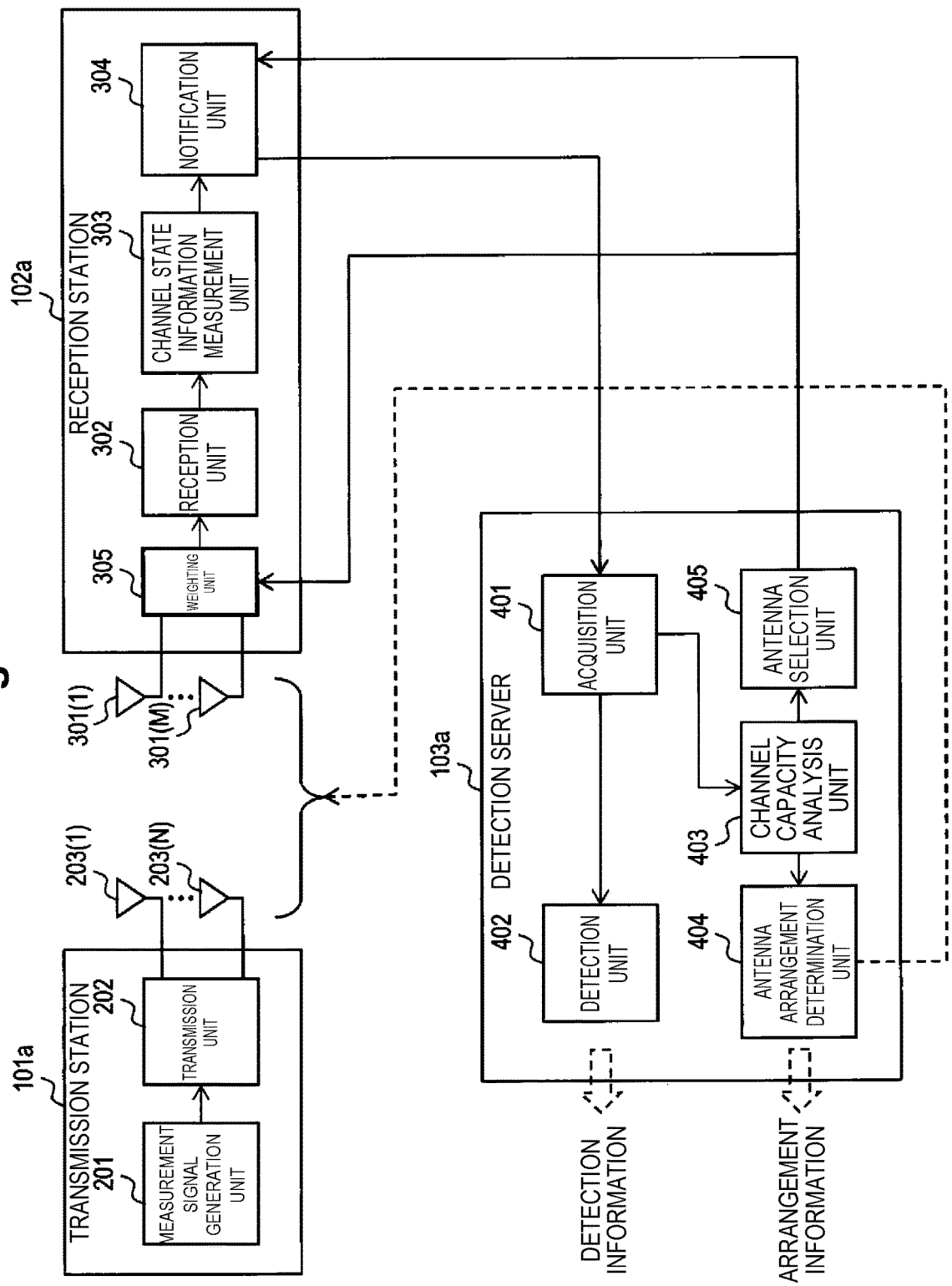
FIG. 7 is a drawing showing an example where a reception station includes a weighting unit.

FIG. 5 shows the example where the transmission station 101a and the reception station 102a include the weighting unit 204 and the weighting unit 305 respectively. However, as shown in FIG. 6, a case is considered where only the transmission station 101a includes the weighting unit 204, and the reception station 102 has the same configuration as the reception station 102 shown in FIG. 2. Alternatively, as shown in FIG. 7, a case is considered where only the reception station 102a includes the weighting unit 305, and the transmission station 101 has the same configuration as the transmission station 101 shown in FIG. 2.

Third Embodiment

Figure 8:
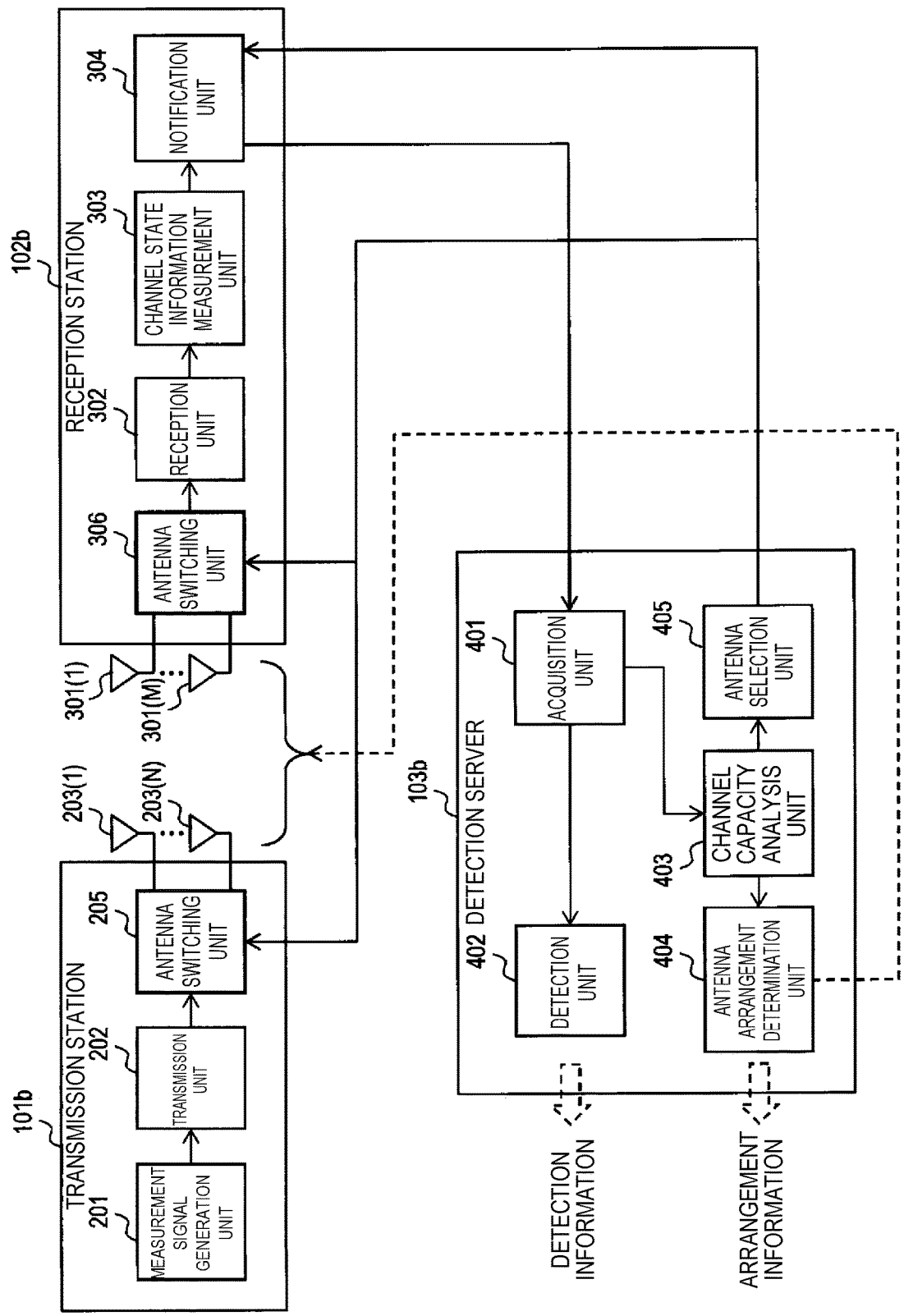
FIG. 8 is a drawing showing a configurational example of a transmission station, a reception station and a detection server according to a third embodiment.

FIG. 8 shows a configurational example of a transmission station 101b, a reception station 102b and a detection server 103b according to a third embodiment. In FIG. 8, in the same manner as FIG. 2, only main functional blocks relating to the embodiment are shown, and functional blocks which a general wireless base station has are omitted. In FIG. 8, blocks having the same symbols as the corresponding blocks shown in FIG. 2 have substantially the same functions as the blocks shown in FIG. 2.

In FIG. 8, the transmission station 101b includes a measurement signal generation unit 201, a transmission unit 202, a plurality of antennas 203 and an antenna switching unit 205. The reception station 102b includes a plurality of antennas 301, a reception unit 302, a channel state information measurement unit 303, a notification unit 304 and an antenna switching unit 306. In the embodiment, the transmission station 101b corresponds to a wireless base station in a wireless LAN system, for example, and the reception station 102b corresponds to a wireless terminal station in the wireless LAN system, for example.

In the transmission station 101b, the measurement signal generation unit 201, the transmission unit 202 and the antennas 203 are operated substantially in the same manner as the transmission station 101 shown in FIG. 2. In the reception station 102b, the antenna 301, the reception unit 302, the channel state information measurement unit 303 and the notification unit 304 are operated substantially in the same manner as the reception station 102 shown in FIG. 2.

In FIG. 8, an antenna switching unit 205 of the transmission station 101b has a mechanism which switches the plurality of antennas 203 into an antenna switching pattern (a pattern identifying a selected antenna) which is set in advance. In such a configuration, the plurality of antennas 203 may be different kinds of antennas. The respective antennas 203 may be connected to the antenna switching unit 205 by cables, and may be used as distributed antennas. Switching of the antennas 203 is controlled in accordance with a command from an antenna selection unit 405 of the detection server 103b.

In the same manner, an antenna switching unit 306 of the reception station 102b has a mechanism which switches the plurality of antennas 301 into an antenna switching pattern (a pattern identifying a selected antenna) which is set in advance. In such a configuration, the plurality of antennas 301 may be different kinds of antennas. The respective antennas 301 may be connected to the antenna switching unit 306 by cables, and may be used as distributed antennas. Switching of the antennas 301 is controlled in accordance with a command from the antenna selection unit 405 of the detection server 103b.

In this manner, in the antenna arrangement method according to the embodiment, in the same manner as the system shown in FIG. 2 described in the first embodiment, channel state information is measured by transmitting and receiving measurement signals between the transmission station 101b and the reception station 102b, and the combination of an optimum antenna arrangement and an antenna switching pattern can be determined based on a channel capacity or an eigenvalue distribution calculated for each combination of an antenna arrangement and an antenna switching pattern.

In the antenna arrangement method according to the first embodiment, the optimum antenna arrangement is determined out of the plurality of antenna arrangements which include locations where the transmission station 101 and the reception station 102 are installed. In the antenna arrangement method according to the second embodiment, the optimum antenna arrangement and the antenna switching pattern are determined out of the plurality of combinations of the antenna arrangements and the antenna switching patterns and hence, the detection accuracy of the wireless detection system 100 can be enhanced. Also, in the antenna selection method, a channel capacity or an eigenvalue distribution is calculated for each combination of the antenna arrangement and the antenna switching pattern, and an antenna which is not used in the detection of an object can be selected in the same manner as the first embodiment.

Figure 9:
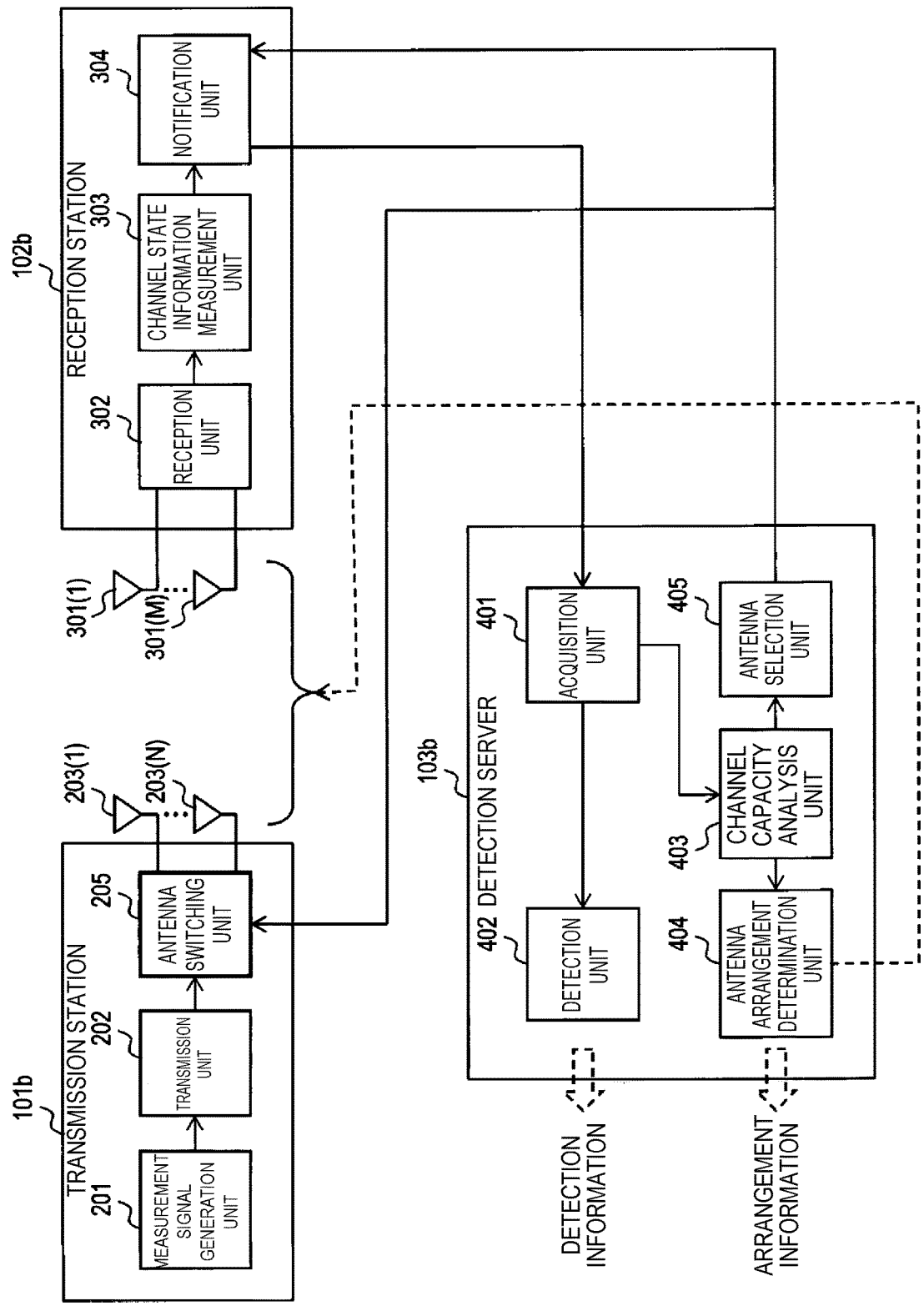
FIG. 9 is a drawing showing an example where a transmission station includes an antenna switching unit.
Figure 10:
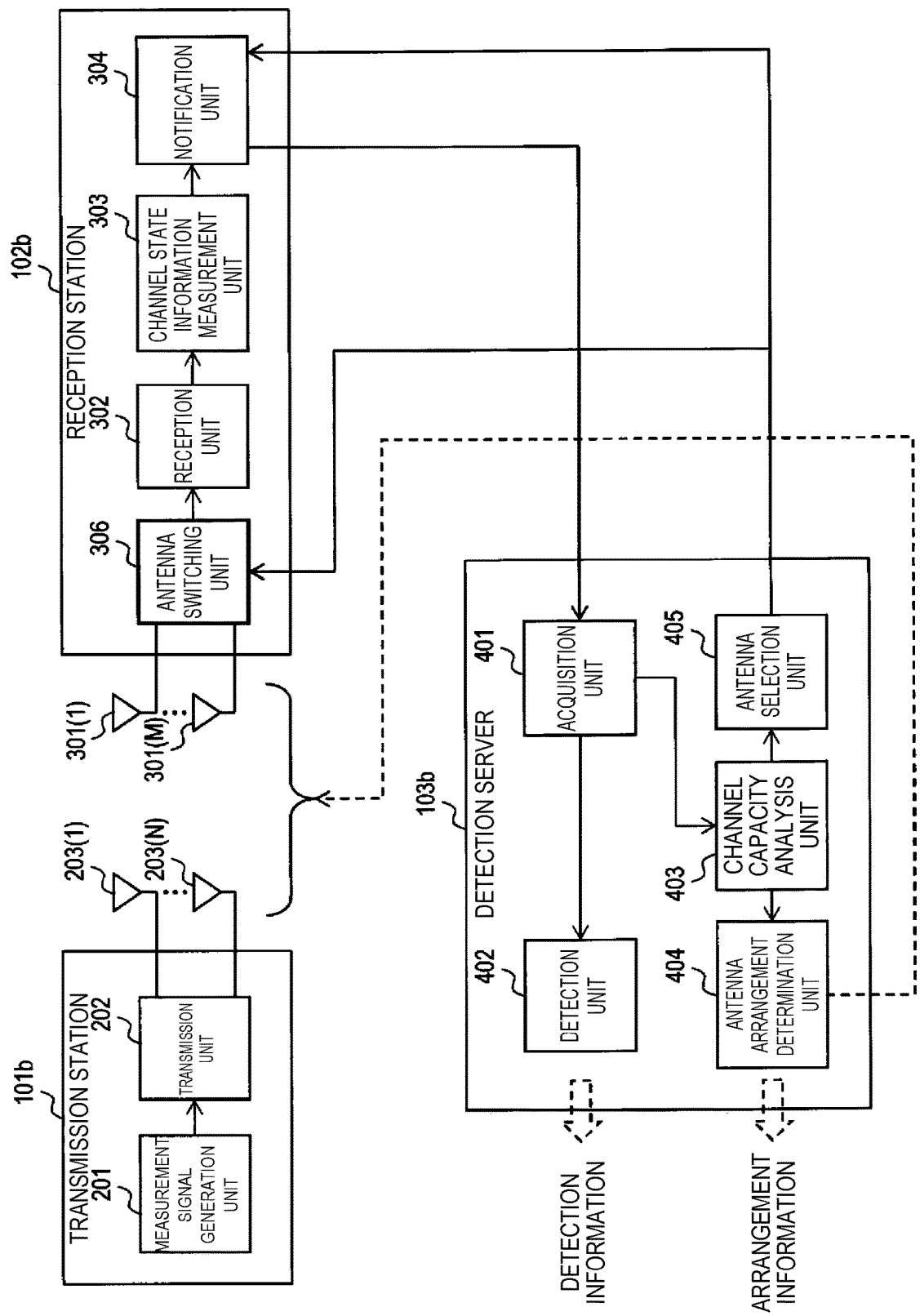
FIG. 10 is a drawing showing an example where a reception station includes an antenna switching unit.

FIG. 8 shows the example where the transmission station 101b and the reception station 102b include the antenna switching unit 205 and the antenna switching unit 306 respectively. However, as shown in FIG. 9, a case is considered where only the transmission station 101b includes the antenna switching unit 205, and the reception station 102 has the same configuration as the reception station 102 shown in FIG. 2. Alternatively, as shown in FIG. 10, a case is considered where only the reception station 102b includes the antenna switching unit 306, and the transmission station 101 has the same configuration as the transmission station 101 shown in FIG. 2.

[Modification]

In the above-mentioned respective embodiments, the antenna arrangement is determined based on a channel capacity or an eigenvalue distribution. However, the antenna arrangement may be determined by also adding a change ratio of a propagation channel to the channel capacity or an eigenvalue distribution.

FIG. 11 shows an example of processing for determining antenna arrangement by adding a change ratio of a propagation channel. Processing shown in FIG. 11 corresponds to the processing of the antenna arrangement method described in FIG. 3. Processing from step S101 to step S104 and processing from step S106 to step S110 are equal to the processing in the antenna arrangement method described in FIG. 3. Only processing in step S105a in FIG. 11 differs from processing in step S105 in FIG. 3.

In step S105a, a channel capacity or an eigenvalue distribution is calculated based on channel state information between respective antennas stored in step S104, and a change ratio of channel state information is also calculated. Then, based on the change ratio of the propagation channel between the respective antennas, for example, specifically, antennas where more channel state information are changed are selected based on the distribution of a correlation matrix of channel state information from a point of time to another point of time.

In this manner, in the modification, by adding a change ratio of channel state information to the determination of the antenna arrangement, the antenna arrangement of the wireless detection system 100 which can perform the detection of an object with higher accuracy can be determined.

As has be described in the respective embodiments, according to the antenna arrangement method and the antenna selection method of the present invention, in the wireless detection system 100 which performs the detection of an object and the detection of an activity using channel state information, it is possible to determine the antenna arrangement where a wireless signal reaches in a wide range in the detection area 150 so that high detection accuracy can be acquired. Further, an amount of undesired information can be reduced by not selecting antennas which do not largely contribute to detection accuracy.

REFERENCE SIGNS LIST 101, 101a, 101b transmission station
102, 102a, 102b reception station
103, 103a, 103b detection server
201 measurement signal generation unit
202 transmission unit
203, 301 antenna
204, 305 weighting unit
205, 306 antenna switching unit
302 reception unit
303 channel state information measurement unit
304 notification unit
401 acquisition unit
402 detection unit
403 channel capacity analysis unit
404 antenna arrangement determination unit
405 antenna selection unit

The invention claimed is:

1. An antenna placement method in a system for detecting an object in a detection area between at least one set of a transmission station and a reception station by a wireless signal, the antenna placement method comprising:
   a) making the transmission station having a plurality of antennas transmit a measurement signal for measuring channel state information;
   b) making the reception station having a plurality of antennas measure the channel state information based on the measurement signal and notify a detection server of a result of the measurement; and
   c) making the detection server perform processing where the detection server detects an object based on the channel state information, calculates at least one of a channel capacity and an eigenvalue distribution based on a propagation channel matrix between the transmission station and the reception station,
   d) changing position of at least one antenna associated with the transmission station or the reception station to yield a plurality of antenna arrangements, and repeating step a)-d) for multiple iterations; and
   selecting an antenna arrangement from amongst the plurality of antenna arrangements where the channel capacity becomes a largest, thereby tailoring the antenna arrangement to detect the object.

2. The antenna placement method according to claim 1, further comprising:
   providing a function of performing weighting to a signal of the antennas of at least one of the transmission station and the reception station; and
   making the detection server perform processing where the detection server calculates at least one of the channel capacity and the eigenvalue distribution based on the propagation channel matrix between the transmission station and the reception station for each of a plurality of combinations of an antenna arrangement and a weighting coefficient, and determines a combination of the antenna arrangement and the weighting coefficient where the channel capacity becomes the largest or the combination of the antenna arrangement and the weighting coefficient where spreading of the eigenvalue distribution becomes the smallest.

3. The antenna placement method according to claim 1, comprising:
   providing a function of switching the antennas of at least one of the transmission station and the reception station; and
   making the detection server perform processing where the detection server calculates at least one of the channel capacity and the eigenvalue distribution based on the propagation channel matrix between the transmission station and the reception station for each of a plurality of combinations of an antenna arrangement and an antenna switching pattern, and determines a combination of the antenna arrangement and the antenna switching pattern where the channel capacity becomes the largest or the combination of the antenna arrangement and the antenna switching pattern where spreading of the eigenvalue distribution becomes the smallest.

4. The antenna placement method according to claim 1, wherein the channel capacity is calculated by a following equation $C = \log_2 \det(I + H^H H)$, wherein I is an identity matrix, H is a propagation channel matrix normalized so that an entire norm is 1, and $^H$ is a Hermitian matrix.

5. An antenna placement method in a system for detecting an object in a detection area between at least one set of a transmission station and a reception station by a wireless signal, the antenna placement method comprising:
 a) making the transmission station having a plurality of antennas transmit a measurement signal for measuring channel state information;
 b) making the reception station having a plurality of antennas measure the channel state information based on the measurement signal and notify a detection server of a result of the measurement; and
 c) making the detection server perform processing where the detection server detects an object based on the channel state information, calculates an eigenvalue distribution based on a propagation channel matrix between the transmission station and the reception station,
 d) changing position of at least one antenna associated with the transmission station or the reception station to yield a plurality of antenna arrangements, and repeating step a)-d) for multiple iterations; and
 selecting an antenna arrangement from amongst the plurality of antenna arrangements where spreading of the eigenvalue distribution becomes a smallest, thereby tailoring the antenna arrangement to detect the object.

6. The antenna placement method according to claim 5, further comprising:
 providing a function of performing weighting to a signal of the antennas of at least one of the transmission station and the reception station; and
 making the detection server perform processing where the detection server calculates the channel capacity and the eigenvalue distribution based on the propagation channel matrix between the transmission station and the reception station for each of a plurality of combinations of an antenna arrangement and a weighting coefficient, and determines a combination of the antenna arrangement and the weighting coefficient where the channel capacity becomes the largest or the combination of the antenna arrangement and the weighting coefficient where spreading of the eigenvalue distribution becomes the smallest.

7. The antenna placement method according to claim 5, comprising:
 providing a function of switching the antennas of at least one of the transmission station and the reception station; and
 making the detection server perform processing where the detection server calculates the channel capacity and the eigenvalue distribution based on the propagation channel matrix between the transmission station and the reception station for each of a plurality of combinations of an antenna arrangement and an antenna switching pattern, and determines a combination of the antenna arrangement and the antenna switching pattern where the channel capacity becomes the largest or the combination of the antenna arrangement and the antenna switching pattern where spreading of the eigenvalue distribution becomes the smallest.

8. The antenna placement method according to claim 5, wherein the channel capacity is calculated by a following equation $C = \log_2 \det(I + H^H H)$, wherein I is an identity matrix, H is a propagation channel matrix normalized so that an entire norm is 1, and $^H$ is a Hermitian matrix.

* * * * *